United States Patent
Udden et al.

[11] 3,952,822
[45] Apr. 27, 1976

[54] ELECTRICALLY POWERED WHEEL-CHAIR FOR INDOOR AND OUTDOOR USE

[75] Inventors: Per Udden, Timra; Siegfrid Graf, Fagervik; Bert Engman, Soberge, all of Sweden

[73] Assignee: Stiftelsen Teknisk Hjalp at Handikappade Permobilstiftelsen, Timra, Sweden

[22] Filed: Mar. 18, 1974

[21] Appl. No.: 452,146

[30] Foreign Application Priority Data
Mar. 19, 1973 Sweden .............................. 7303827

[52] U.S. Cl. .................................. 180/21; 180/6.5; 180/27; 180/65 R; 180/DIG. 3; 297/DIG. 4
[51] Int. Cl.² ......................................... B62D 61/12
[58] Field of Search ................... 180/21, 25, 26, 27, 180/DIG. 3, 65 R; 296/65 R; 280/DIG. 5, 150 A; 297/240, DIG. 4

[56] References Cited
UNITED STATES PATENTS

| | | | |
|---|---|---|---|
| 1,262,806 | 4/1918 | Kemble | 180/21 |
| 2,266,200 | 12/1941 | Hedley | 296/65 R |
| 2,290,464 | 7/1942 | Buchheit | 296/65 R |
| 2,614,643 | 10/1952 | Quayle | 180/21 |
| 2,710,659 | 6/1955 | Moederle | 180/DIG. 3 |
| 2,749,997 | 6/1956 | Deslippe | 180/25 R |
| 2,834,608 | 5/1958 | Wixson | 280/150 A |
| 2,854,084 | 9/1958 | Isaac | 180/26 R |
| 2,966,951 | 1/1961 | Lang | 180/65 R X |
| 3,416,625 | 12/1968 | Narutani | 180/21 X |
| 3,566,985 | 3/1971 | Triplett | 180/26 R |
| 3,573,877 | 4/1971 | Locke | 280/5.2 |
| 3,603,609 | 9/1971 | Hott et al. | 180/25 R |
| 3,664,450 | 5/1972 | Udden et al. | 180/65 R |

*Primary Examiner*—Kenneth H. Betts
*Attorney, Agent, or Firm*—Walter Becker

[57] ABSTRACT

An electrically powered wheel-chair for indoor and outdoor use comprising a pair of rear main wheels, which are non-pivotably connected with the framework of the chair, at least one of said wheels being driven by an electric motor. A steering wheel being rotatably connected with the frame-work of the wheelchair and positioned in front of the main wheels, said steering wheel being asymmetrically located on one side of a longitudinal axis through the middle of the chair. A support wheel being positioned on the other side of said longitudinal axis relative to the steering wheel at such a level above a flat and horizontal ground surface that it will not touch this surface when the steering wheel directed straight ahead. The diameter of the support wheel is less than that of the steering wheel and the distance from the fore-most point of the steering wheel to a transverse axis through the centers of the main wheels is greater than the corresponding distance for the support wheel. To provide good stability the electric batteries are located in a case thus designed that the common center of gravity of the batteries will be located on the same side of the longitudinal axis of the chair as the steering wheel. The frame-work is moreover equipped with two auxiliary support wheels on either side of the chair and rearwards the main wheels.

7 Claims, 4 Drawing Figures

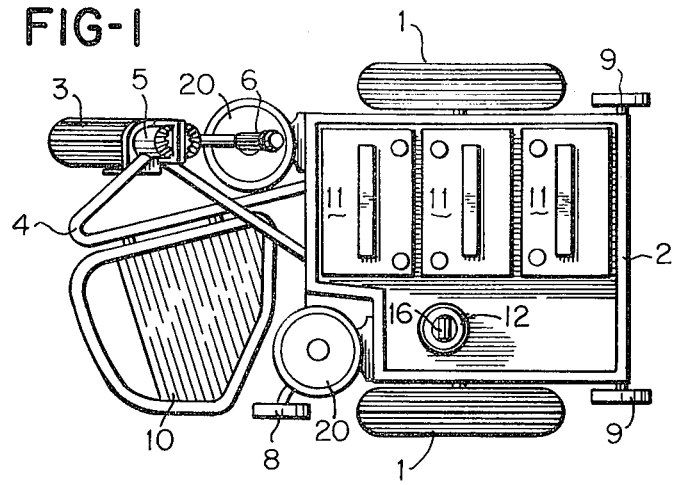
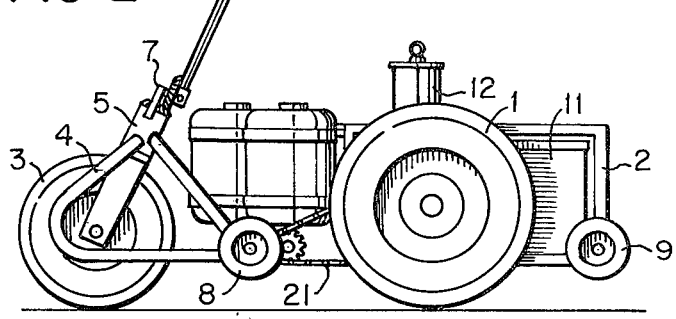
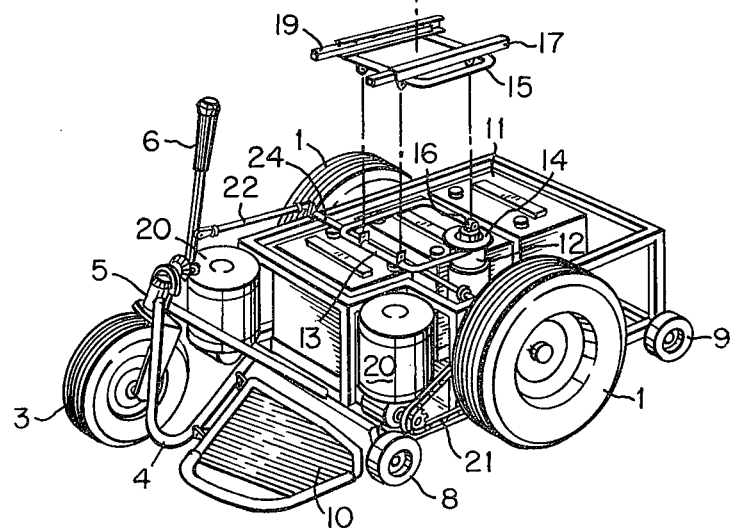

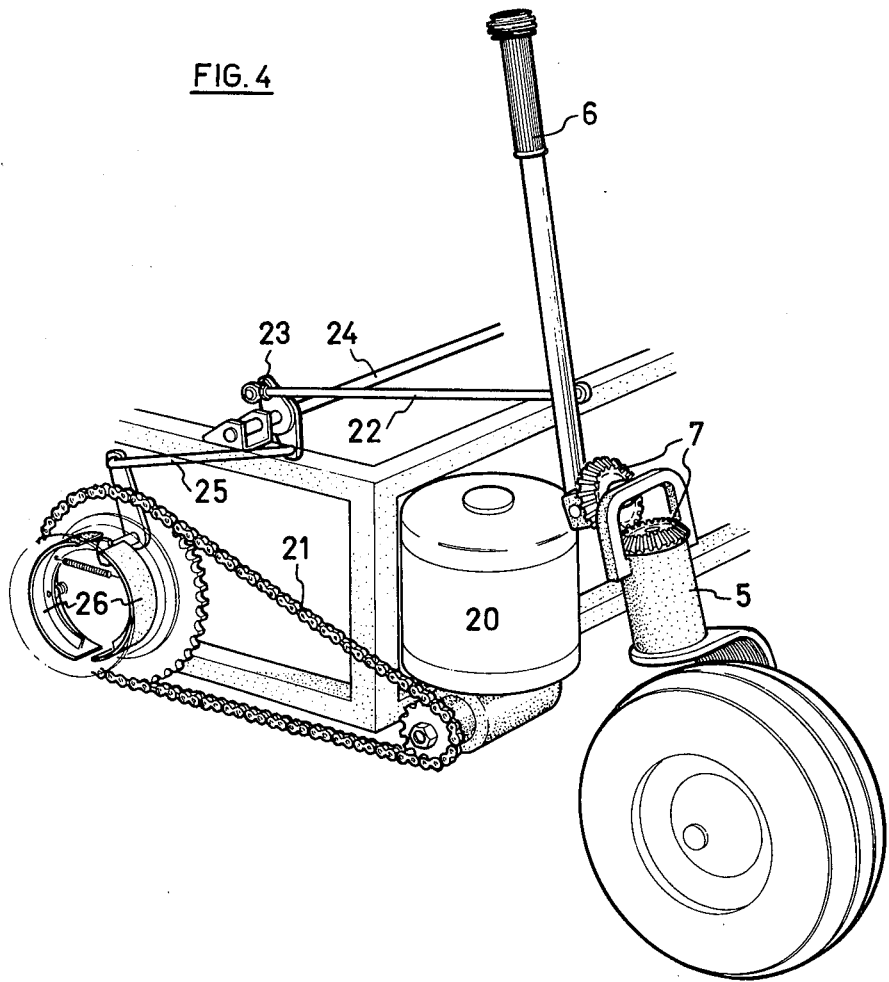

ELECTRICALLY POWERED WHEEL-CHAIR FOR INDOOR AND OUTDOOR USE

The present invention relates to an electrically powered wheel-chair for indoor and outdoor use comprising, a pair of rear main wheels rigidly connected with the chassis of the chair, at least one of said mainwheels being driven by an electric traction motor, a front steering wheel, which is rotatably connected with the chassis.

The conventional wheel-chair for indoor use has one large driving wheel on either side of the seat, and one or two smaller wheels disposed in front of or behind the driving wheels usually in the form of castor wheels with vertical pivots. Such wheel-chairs cannot be used outdoors, except on a flat and hard surface. To be suitable for indoor use, the dimensions of a chair must be kept within very narrow limits, and its steering wheels must be arranged to minimize its turning radius.

There are motor-driven wheel-chairs to be used both indoors and outdoors, where the front wheels are rigidly connected with the chassis, and the rear wheels are assembled to one unit, which is pivotable relative to the chassis. This type of wheel-chair, which is called "PERMOBIL SUPERIOR" (registered trade mark), is disclosed in Swedish Pat. Specification No. 306,805 and is intended primarily for severely handicapped persons which are incapable of driving or steering a wheel-chair manually. In the Permobil Superior these functions are accomplished by electric servo motors, which are controlled by impulses initiated by the invalid by means, for example, of a suction- and blowing-nozzle.

Further, there are three-wheeled wheel-chairs, in which the steering wheel is disposed in front of or behind a person sitting in the chair, or between his feet. Where the steering wheel is disposed at the rear end, the vehicle will have to be made extremely elongate in order to attain satisfactory stability properties. If the steering wheel is disposed between the feet of the occupant, the chair cannot climb kerb stones and unevennesses on the ground surface without great danger for turning over. Several such three-wheeled chairs are intended primarily for outdoor use, since the design generaly requires so much space that the chair does not satisfy the requirements of compactness, and thus will be unwieldy to handle indoors. Other wheelchairs with the steering wheel disposed between the feet of the occupant are adapted primarily for indoor use but, as mentioned above, they will be instable in outdoor use.

Further, there are four-wheeled single vehicles for outdoor use with extremely advantageous properties for cross-country driving. These chairs are neither suitable to use indoors, since the design is primarily adapted to satisfy extremely great demands on stability and thus is not sufficiently compact nor has this chair sufficiently small turning radius to be used indoors.

Thus, up till now the above-described conventional type of wheel-chair for indoor use has been the only facility available for less seriously disabled people and it has as such been an extremely valuable implement. This conventional indoor chair, however, has many drawbacks causing inconveniences to the operator. Thus, it can be diffcult for a disabled person to get into and out of the chair without any assistance, since the seat is fixed and the seat direction coincides with the direction of the main wheels. Therefore, the chair must either be held on or its brakes must be applied before the operator can take or leave the chair, in order to prevent it from beginning to move. Further, an occupant may encounter difficulties in coming sufficiently close to a work bench or the like with an underlying case or cupboard. This will of course aggravate the possibilities for an invalid to work in normal office and factory premises and the difficulties for the integration of disabled persons in a normal working life will thus be unnecessary increased.

The main object of the present invention is to provide a compact wheel-chair which is easy to handle, has small turning radius and good stability properties. Further, the chair should be easy to take and leave, and it should also be possible for the disabled person to discharge his calls of nature from the chair without the necessity of leaving it.

A further object of the invention is to provide a wheel-chair which has good stability and maneuverability properties so that it can be driven outdoors on hilly ground, for instance on sloping greens or paths, thereby reducing the need for two chairs, viz. one specific indoor chair and one for outdoor use, to one single chair for both applications of use.

These objects are realised in a wheel-chair according to the present invention substantially by the fact that the steering wheel is located on one side of a longitudinal axis through the middle of the chair, and that a support wheel with less diameter than the steering wheel is connected with the chassis and located on the other side of said longitudinal axis relative to said steering wheel at such a level that it will not touch a horizontal and even support surface, and that the distance from the foremost point of the steering wheel to a transverse axis through the centres of the main wheels is greater than the corresponding distance for the support wheel.

The supporting wheel is preferably non-pivotally connected with the chassis, which in one embodiment of the invention is designed in the form of a case for batteries the common centre of gravity of which is disposed on the same side of the longitudinal axis through the center of the chair as the steering wheel, thereby increasing the stability of the vehicle.

In order to realize the object to facilitate the taking and leaving of the chair, the seat of the chair is rotatably supported on the bottom of the battery case on a surface, which is positioned on the opposite side of the longitudinal axis through the middle of the chair relative to that of the common centre of gravity of the batteries. The seat support can suitably be in the form of a telescoping tubular column, which is associated with a rectangular frame for the seat and is rigidly secured to one corner of this frame. When the occupant is to leave the chair, the seat is preferably rotated from an angular position substantially in parallel with the longitudinal axis of the chair to an outwards turned position, about 90° from the straight forward position. The rotational axis of the seat coincides with the centre axis of the tubular column, and the column is fastened to one corner of the seat frame located in/the rear section and towards the leaving side of the chair whereby the front section of the seat will be positioned substantially outside one rear wheel when the seat is in its outwards turned position thereby facilitating the disabled person to take and leave the chair.

In order to improve the rearward stability of the chair, the chassis is provided on either side thereof and rearwards to the main wheels with two auxiliary supporting wheels. These supporting wheels are of particular importance when the chair is climbing up a hill or when the occupant is leaning heavily backwards.

One embodiment of the invention will now be described more in detail with reference to the accompanying drawings, in which:

FIG. 1 is a top-plan view of a wheel-chair according to the invention with the seat removed;

FIG. 2 is a side-elevational view of the chair shown in FIG. 1;

FIG. 3 is a perspective view of the chair, with the seat shown in an exploded view; and FIG. 4 is a perspective view of the steering gear as well as the driving and braking mechanism for one of the main wheels.

As illustrated in FIGS. 1 and 2, the wheel-chair of the invention comprises a pair of rear wheels 1, which are non-pivotally mounted on the chassis 2. Further, a steering wheel 3 is pivotally connected with a frame 4 of the chassis, which frame carries a steering column 5 for the steering wheel. Rotational movement of the steering wheel is effected by means of a control lever 6 the angular movement of which is converted by a bevel gearing 7 into a corresponding rotational movement of the steering wheel. This arrangement is particularly suitable since it provides a greater deflection of the wheel than tie rods, which in addition, require considerably greater space. The chassis further carries a support wheel 8, which is disposed on the opposite side of a longitudinal axis through the centre of the chair relative to the steering wheel. The support wheel is disposed at a certain height above the ground surface, which means that it will not be in touch with the ground when driving the chair straight ahead on a flat and horisontal surface. However, when turning the chair to the side opposite to that of the support wheel, i.e., when turning right in the embodiment shown, the chair will tilt outwards in the curve, and the support wheel 8 will contact the ground and prevent the chair from turning over. The support wheel will also touch the ground if, for instance, the chair is moved straight ahead down a slope or the like. Two further support wheels 9 are carried at the rear section of the chassis and these wheels do not touch a horizontal ground plane either, when the chair is unloaded. When driving up-hill or if the occupant should lean heavily backwards, these rear supporting wheels will, however, touch the ground, thereby preventing the chair from turning over backwards.

The resultant centre of gravity for the chair and a person sitting therein with the seat in its straight forward position will lie on a vertical line positioned immediately in front of a transverse axis through the centres of the main wheels. This arrangement enables the extremely compact construction of the chair, which, however, has called for the necessity of providing it with the rear support wheels. The chassis further carries a foot-plate 10, which is hinged to the front frame 4. In the embodiment shown. the support wheel 8 is disposed behind the outer edge of the foot-plate 10, whereby the taking and leaving of the seat will be considerably facilitated. This arrangement will also permit enough room for the feet. In addition, the foot-plate is positioned beside the steering wheel 3, whereby the sitting direction for a person in normal driving attitute will form a certain angle relative to the longitudinal axis of the chair. The size of the steering wheel 3 has been selected to facilitate outdoor operation.

Further, the portion of the chassis 2 located between the main wheels 1 is designed as a case for batteries 11, which are asymmetrically disposed in this case in such a way that their common centre of gravity will be positioned on the same side of the longitudinal axis through the centre of the chair as the steering wheel. This arrangement permits the batteries to form a counterbalancee to a person sitting in the seat, which is carried by a telescoping tubular column 12 the lower end of which is supported on the bottom of the battery case. The seat arrangement is shown in FIG. 3 and comprises a lower frame 13, which is welded to a collar 14 on the upper tube of the column. An upper frame 15 is connected at the front section of the seat with the lower seat frame 13, whereas its rear section is connected with a shock absorber 16, which is housed within the tubular column and which is surrounded by a coil spring. The upper seat frame 15 is further provided with longitudinally extending channel bars 17 in which guide rods 19 secured to the seat 18 are displaceable and can be locked in any desired position. This arrangement provides for an adjustable position of the seat in the sitting direction, which makes it possible to change the resultant centre of gravity in a way either to reduce the loading of the steering wheel to facilitate maneuvering, or to increase this loading in order to improve the steering function, for instance when driving up-hill. Since the channel bars 17 and the guide bars 19 displaceable therein are positioned above the centre of rotation of the seat, which can be displaced in the sitting direction even in the outwards turned position of the seat, thereby enabling the operator to sit with his legs in a normal attitude beneath a table. The seat can, of course, be locked in any desired position by some form of locking device, for instance by means of a screw on a handle, which can be set in two different positions. The seat with the frame assembly and the upper tubular column are rotatable in the lower and outer tubular column connected with the bottom of the battery case from one inwards turned position shown in FIG. 3 to an outwards turned position about 90 degrees from the first position, in which the front section of the seat will be positioned outside the left main wheel, whereby the occupant without being hindered by the wheels and the foot-plate can get close to a work bench or the like. Since the wheels are directed in parallel with the work bench, the occupant will be able to move along the bench in the chair and with the seat in its outwards turned position.

As illustrated in FIGS. 1 to 3, the main wheels are driven by electric motors 20 through conventional chain transmissions 21. The main wheels can be individually braked by means of the steering lever 6, which besides the swingable movement in a plane substantially transverse to the longitudinal direction of the chair is movable back and forth in the longitudinal direction. This latter movement is transferred through a link-rod 22 to a lever arrangement 23, which on one hand converts the movement to a rotary motion of a transverse link-rod 24 and, on the other hand, transmits the movement to a further link-rod 25 actuating a lever in operative connection with the brakeshoes of the right main wheel. The transverse link-rod is journalled in the chassis and transmits the rotational motion to a corresponding linkage for the left main wheel, the brake-shoes of which are actuated in a similar way. When the steering lever is pulled backwards the brakes of both main wheels will be actuated simultaneously, and the chair will be braked by a substantially uniform braking action on the main wheels.

The arrangement of driving the main wheels with individual electric motors provides a wheel-chair which has extremely good driving characteristics even on sloping ground. Since the steering wheel tends to loose its ground contact when driving up-hill, the steering gear has been provided with micro-switches, which at certain lateral movements of the steering lever partly disconnects one traction motor so that the other contributes to turn the chair in the desired direction to a degree corresponding to the lateral movement of the lever. Further, the back and forth movements of the steering lever will also affect a speed potentiometer in which the operating range is positioned immediately in front of the range within which the braking operation will occur. Thus, in the embodiment disclosed a forward position of the steering lever means that the speed potentiometer is entirely disconnected, i.e., the chair is driven at maximum speed. When the steering lever is then pulled backwards, the speed potentiometer will be progressively engaged, and when the speed potentiometer is completely switched-in the braking operation will be initiated which means that the main wheels are completely disconnected from their traction motors. The braking progress from full speed ahead to stand-still will thus proceed smoothly and without any danger of throwing the occupant off the chair.

The structural design here described can, of course, be utilized for single-motor operation, but this would reduce the outdoor use of the chair. In other embodiments of the chair according to the invention, the steering operation can, of course, be effected by servo-technical means.

We claim:

1. An electrically powered wheel-chair for stable and maneuverable indoor and outdoor use, comprising in combination:
    a pair of rear main wheels, which are rigidly connected with the frame of the chair, at least one of said main wheels being driven by an electric traction motor,
    a front steering wheel, which is rotatably connected with the frame and located on one side of a longitudinal axis through the middle of the chair,
    a support wheel with less diameter than the steering wheel, said support wheel being connected with the frame and located on the other side of said longitudinal axis relative to said steering wheel at such a level that it will not touch a horizontal and even support surface when the steering wheel is directed straight ahead, whereby the fore-most point of the steering wheel is located ahead of the fore-most point of the support wheel, a portion of the frame positioned between the main wheels being designed in the form of a case, adapted to contain batteries, the common center of gravity of which will be located on the same side of the longitudinal axis of the chair as the steering wheel.

2. An electrically powered wheel-chair for indoor and outdoor use, comprising:
    a pair of rear main wheels, which are rigidly connected with the frame of the chair, at least one of said main wheels being driven by an electric traction motor,
    a front steering wheel, which is rotatably connected with the frame and located on one side of a longitudinal axis through the middle of the chair,
    a support wheel with less diameter than the steering wheel, said support wheel being connected with the frame and located on the other side of said longitudinal axis relative to said steering wheel at such a level that it will not touch a horizontal and even support surface when the steering wheel is directed straight ahead, whereby the fore-most point of the steering wheel is located ahead of the fore-most point of the support wheel, a portion of the frame positioned between the main wheels being designed in the form of a case, adapted to contain batteries, the common center of gravity of which will be located on same side of the longitudinal axis of the chair as the steering wheel, and that a seat of the chair is pivotally supported by a tubular column resting on the bottom of the battery case on a surface thereof, the center of said column being located on the other side of said longitudinal axis relative to the center of gravity of the batteries.

3. A wheel-chair as claimed in claim 2, characterized in that the support wheel is non-pivotally connected with the frame.

4. A wheel-chair as claimed in claim 2, characterized in that the tubular column is telescopically arranged and supports a rectangular seat-frame, one corner of which is rigidly secured to the column.

5. A wheel-chair as claimed in claim 4, characterized in that the seat is rotatable between a straight forward position substantially in parallel with the longitudinal axis of the chair and an outwards turned position, about 90° from said straight forward position, the rotational axis of the seat coinciding with the center axis of the tubular column, and the column being fastened to one corner of the seat frame located in the rear section thereof, whereby the front section of the seat will be positioned substantially outside one of the main wheels, when the seat is in its outward turned position thereby facilitating taking and leaving of the seat.

6. A wheel-chair as claimed in claim 2, characterized in that the frame is provided with two auxiliary support wheels on either side of the chair and rearwards of the main wheels.

7. A wheel-chair as claimed in claim 2, characterized in that the location of the resultant center of gravity of the chair and a person sitting therein is selected to lie close to and in front of a transverse axis through the centers of the main wheels, provided that the occupant has taken up normal steering position and is driving on substantially horizontal ground.

* * * * *